United States Patent Office 3,745,162
Patented July 10, 1973

3,745,162
1,2,3,4-TETRAHYDROISOQUINOLINE-2-(THIO)-
CARBOXAMIDES
Grover Cleveland Helsley, Richmond, Va., assignor to
A. H. Robins Company, Incorporated, Richmond, Va.
No Drawing. Filed Aug. 31, 1970, Ser. No. 68,591
Int. Cl. C07d 33/10
U.S. Cl. 260—283 S    6 Claims

ABSTRACT OF THE DISCLOSURE 4-aryl(-4-hydroxy) - 1,2,3,4 - tetrahydroisoquinoline-2(-2-thio)-carboxamides prepared by reacting 4-aryl(-4-hydroxy) - 1,2,3,4 - tetrahydroisoquinolines with nitrourea, alkyl isocyanates, alkyl isothiocyanates, aryl isocyanates, aryl isothiocyanates and N,N - disubstituted carbamoyl halides are described. The compounds are useful as anticonvulsants.

---

The present invention is concerned with 1,2,3,4 - tetrahydroisoquinolines and is more particularly concerned with 4 - aryl(-4-hydroxy) - 1,2,3,4 - tetrahydroisoquinoline-2(2-thio)-carboxamides and methods for the preparation thereof.

Still more particularly, this invention relates to novel compounds of the formula:

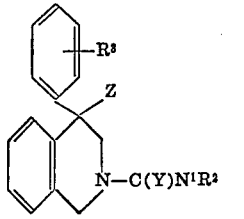

Formula I wherein:
$R^1$ is hydrogen, lower-alkyl and phenyl,
$R^2$ is hydrogen, lower-alkyl and phenyl,
$R^3$ is hydrogen, lower-alkyl, lower-alkoxy and trifluoromethyl,
Z is hydrogen or hydroxy, and
Y is oxygen or sulfur.

The novel compounds of the present invention having Formula I are useful in preventing convulsions and are, therefore, particularly useful as anticonvulsant compounds.

The prior art literature discloses 4-phenyl - 1,2,3,4-tetrahydroisoquinolines. In a particular embodiment of the present invention, compounds having anticonvulsant activity are realized by the combination of an aryl group at the 4-position of the isoquinoline nucleus and a carbamonyl group at the 2-position or the combination of an aryl group and a hydroxy group at the 4-position of the isoquinoline nucleus and a carbamoyl group at the 2-position. The group at the 2-position can also be a thiocarbamoyl group.

It is, therefore, a primary object of the present invention to provide novel 4-aryl(-4-hydroxy) - 1,2,3,4 - tetrahydroisoquinoline-2(-2-thio)-carboxamides and processes for their production. Another object of the present invention is to provide valuable therapeutic preparations comprising said novel compounds, said therapeutic preparations being useful as anticonvulsants. Other objects and advantageous features of the present invention will be apparent to one skilled in the art, and other objects will become apparent from the following description and the appended claims.

In the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, butyl, tertiary butyl, amyl, hexyl, isoamyl, heptyl, octyl, and the like.

The novel compounds of this invention as represented by Formula I are prepared from 4-aryl-4-hydroxy)-12,3,4 - tetrahydroisoquinolines by reaction with nitrourea, alkyl isocyanates, alkyl isothiocyanates, aryl isocyanates, aryl isothiocyanates, and N,N-disubstituted carbamoyl halides according to the following reaction scheme.

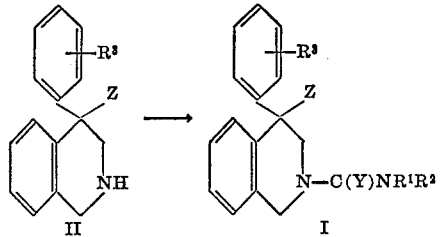

The starting materials of the present invention represented by Formula II above are in some instances known compounds, or they can be readily prepared by methods disclosed in the art or by methods of preparation disclosed hereinafter.

In general, the novel compounds of Formula I can be prepared as follows:

A solution of one part of a 4-aryl(-4-hydroxy)-1,2,3, 4-tetrahydroisoquinoline II in an inert solvent such as chloroform, toluene or benzene is mixed with one part of an isocyanate, isothiocyanate or appropriately substituted carbamoyl halide also dissolved in a nonreactive solvent such as mentioned above. The reaction mixture may be heated at temperatures ranging from room temperature to the refluxing temperature of the solvent, preferably with mechanical stirring for a period of from about one-half hour to about three hours. When an appropriately substituted carbamoyl halide is one of the reactants, the reaction may be facilitated by the addition of one to two parts of an anhydrous basic salt such as sodium carbonate or potassium carbonate which will neutralize the formed hydrogen chloride. When the reaction is complete, the solvent is removed from the reaction mixture by evaporation at reduced pressure. The residual oil usually crystallizes on standing, or it can be crystallized by triturating with a nonpolar solvent as, for example, ligroin. The solid is collected and purified by recrystallization from a suitable solvent or combination of solvents. When a novel compound of Formula I is prepared having a primary carbamoyl group, i.e., a $$—C(O)NH_2$$

group, in the 2-position, a 4-aryl(-4-hydroxy) - 1,2,3,4-tetrahydroisoquinoline II is dissolved in a lower alkanol, illustratively ethanol, a slight excess of nitrourea is added and the mixture is stirred at a temperature of from about 40° C. to about 80° C., preferably at about 60° C. until the evolution of the by-product gas ceases. The product is isolated as hereinabove described.

The following preparations and examples illustrate the methods employed for carrying out the present invention. It is to be understood that the examples are not limiting but are merely illustrative.

PREPARATION 1

2-benzyl-2,3-dihydro-4(1H)-isoquinolone
hydrochloride

To a stirred suspension of 20 g. (0.30 mole) of sodium ethoxide in 200 ml. of dry benzene was added slowly a solution of 70 g. (0.196 mole) of N-benzyl-N- carbethoxybenzyl glycine ethyl ester. After the addition was complete the mixture was heated for six hours under nitrogen with stirring with slow distillation of the azeotropic mixture of ethanol-benzene. After cooling, the reaction mixture was acidified using concentrated hydrochloric acid and then treated with an excess of sodium bicarbonate. The benzene layer was separated, washed with water, dried over magnesium sulfate and the solvent evaporated at reduced pressure giving 48 g. of crude product (81%). The product without further purification was treated with 500 ml. of ethanol and 373 ml. of 2 N sodium hydroxide. The mixture was heated at reflux for three hours, cooled and made acidic with 6 N hydrochloric acid. The acidic solution was refluxed for three hours, cooled and made basic with 6 N sodium hydroxide. The oil which separated was extracted with benzene and the combined extracts were washed with water and dried over magnesium sulfate. The solvent was evaporated and the residual oil weighed 33 g. (89% yield). The free base was converted to the hydrochloride salt which was recrystallized from isopropyl ether-ethanol and melted at 198.5–200.5° C.

*Analysis.*—Calculated for $C_{16}H_{16}ClNO$ (percent): C, 70.20; H, 5.89; N, 5.12. Found (percent): C, 70.33; H, 5.93; N, 5.21.

PREPARATION 2

2-benzyl-4-hydroxy-4-phenyl-1,2,3,4-tetrahydroisoquinoline hydrochloride

To a stirred solution of 0.17 mole of phenylmagnesium bromide in 300 ml. of ether at −50° C. was added slowly a solution of 31.2 g. (0.13 mole) of 2-benzyl-2,3-dihydro-4(1H)-isoquinolone in 500 ml. of ether. The temperature was maintained below −50° C. during the addition. After the addition was complete, the reaction mixture was allowed to warm to room temperature. The mixture was treated with 100 ml. of saturated ammonium chloride solution and filtered. The filtrate was washed with warm water, dried over magnesium sulfate and the solvent evaporated at reduced pressure. The residual oil in isopropanol was treated with ethereal hydrogen chloride. The crystalline hydrochloride weighed 21 g. (47% yield) and melted with decomposition at 215° C. The salt was recrystallized from an isopropanol-methanol mixture and melted with decomposition at 229° C.

*Analysis.*—Calculated for $C_{22}H_{22}ClNO$ (percent): C, 75.10; H, 6.30; N, 3.98. Found (percent): C, 75.21; H, 6.33; N, 4.04.

PREPARATION 3

4-hydroxy-4-phenyl-1,2,3,4-tetrahydroisoquinoline hydrochloride

A solution of 10.5 g. of 2-benzyl-4-hydroxy-4-phenyl-1,2,3,4-tetrahydroisoquinoline hydrochloride in 200 ml. of 95% ethanol was shaken in three atmospheres of hydrogen at 70° C. until one equivalent of hydrogen was absorbed. The suspension was cooled, filtered and the solvent evaporated at reduced pressure. The crystalline residue weighed 6.3 g. (83% yield) and melted with decomposition at 217° C. The salt was recrystallized from an isopropanol-methanol mixture and melted at 230° C. (dec.).

*Analysis.*—Calculated for $C_{15}H_{16}ClNO$ (percent): C, 68.83; H, 6.16; N, 5.35. Found (percent): C, 68.56; H, 6.18; N, 5.39.

PREPARATION 4

2-benzyl-4-hydroxy-4-(m-trifluoromethylphenyl)-1,2,3,4-tetrahydroisoquinoline hydrochloride To a stirred solution of 0.13 mole of m-trifluoromethylphenyl magnesium bromide in 300 ml. of dry ether at −50° C. was added slowly a solution of 21 g. (0.088 mole) of 2-benzyl-2,3-dihydro-4(1H)-isoquinolone in 400 ml. of dry ether. The temperature was maintained below −50° C. during the addition. After the addition was complete the reaction mixture was allowed to warm to room temperature and then treated with 100 ml. of a saturated ammonium chloride solution. The suspension was filtered and the filtrate washed with water, dried over magnesium sulfate and the solvent evaporated at reduced pressure. The residual oil in isopropanol was treated with ethereal hydrogen chloride. The white crystalline salt weighed 13.2 g. (35% yield). The salt was recrystallized from an isopropanol-methanol mixture and melted at 234.5–235.5° C.

*Analysis.*—Calculated for $C_{23}H_{21}ClF_3NO$ (percent): C, 65.79; H, 5.04; N, 3.34. Found (percent): C, 65.83; H, 5.03; N, 3.27.

PREPARATION 5

When, in the procedure of Preparation 4, m-trifluoromethylphenylmagnesium bromide is replaced by an equal molar amount of:

p-tolylmagnesium bromide,
p-anisylmagnesium bromide,
o-ethylphenylmagnesium bromide,
p-ethylphenylmagnesium bromide and
p-ethoxyphenylmagnesium bromide, there are obtained, 2-benzyl-4-hydroxy-4-(p-tolyl)-1,2,3,4-tetrahydroisoquinoline,
2-benzyl-4-hydroxy-4-(p-anisyl)-1,2,3,4-tetrahydroisoquinoline,
2-benzyl-4-hydroxy-4-(o-ethylphenyl)-1,2,3,4-tetrahydroisoquinoline,
2-benzyl-4-hydroxy-4-(p-ethylphenyl)-1,2,3,4-tetrahydroisoquinoline and
2-benzyl-4-hydroxy-4-(p-ethoxyphenyl)-1,2,3,4-tetrahydroisoquinoline.

PREPARATION 6

4-hydroxy-4-(m-trifluoromethylphenyl)-1,2,3,4-tetrahydroisoquinoline hydrochloride A solution of 11.2 g. of 2-benzyl-4-hydroxy-4-(m-trifluoromethylphenyl) - 1,2,3,4-tetrahydroisoquinoline hydrochloride in 200 ml. of 95% ethanol and 6 g. of 10% palladium-on-charcoal catalyst was shaken in three atmospheres of hydrogen at 70° C. until one equivalent of hydrogen was absorbed. The suspension was cooled, filtered and the solvent evaporated at reduced pressure. The crystalline residue was recrystallized from isopropanol; the recrystallized hydrochloride melted at 234–236° C. (dec.).

*Analysis.*—Calculated for $C_{16}H_{15}ClF_3NO$ (percent): C, 58.28; H, 4.59; N, 4.25. Found (percent): C, 58.18; H, 4.59; N, 4.45.

PREPARATION 7

When, in the procedure of Preparation 6, 2-benzyl-4-hydroxy-4-(m-trifluoromethylphenyl) - 1,2,3,4 - tetrahydroisoquinoline hydrochloride is replaced by an equal molar amount of:

2-benzyl-4-hydroxy-4-(p-tolyl)-1,2,3,4-tetrahydroisoquinoline,
2-benzyl-4-hydroxy-4-(p-anisyl)-1,2,3,4-tetrahydroisoquinoline,
2-benzyl-4-hydroxy-4-(o-ethylphenyl)-1,2,3,4-tetrahydroisoquinoline,
2-benzyl-4-hydroxy-4-(p-ethylphenyl)-1,2,3,4-tetrahydroisoquinoline, and
2-benzyl-4-hydroxy-4-(p-ethoxyphenyl)-1,2,3-tetrahydroisoquinoline, there are obtained, 4-hydroxy-4-(p-tolyl)-1,2,3,4-tetrahydroisoquinoline,
4-hydroxy-4-(p-anisyl)-1,2,3,4-tetrahydroisoquinoline, 4-hydroxy-4-(o-ethylphenyl)-1,2,3,4-tetrahydroisoquinoline,
4-hydroxy-4-(p-ethylphenyl)-1,2,3,4-tetrahydroisoquinoline, and
4-hydroxy-4-(p-ethoxyphenyl)-1,2,3,4-tetrahydroisoquinoline.

PREPARATION 8

4-phenyl-1,2,3,4-tetrahydroisoquinoline hydrochloride

A mixture of 14 g. of 4-hydroxy-4-phenyl-1,2,3,4-tetrahydroisoquinoline hydrochloride, 100 ml. of 6 N hydrochloric acid, 100 ml. of 95% ethanol and 6 g. of palladium-on-charcoal catalyst was shaken in three atmospheres of hydrogen at 70° C. until one equivalent of hydrogen was absorbed. The suspension was cooled, filtered, and on standing a white crystalline hydrochloride salt separated. The salt weighed 11.3 g. (85% yield) and melted at 122–124° C. A sample melted at 123–124° C. after it was recrystallized from an isopropanol-isopropyl ether mixture.

*Analysis.*—Calculated for $C_{15}H_{16}ClN$ (percent): C, 73.31; H, 6.56; N, 5.70. Found (percent): C, 73.75; H, 6.56; N, 5.70.

PREPARATION 9

When, in the procedure of Preparation 8, 4-hydroxy-4-phenyl-1,2,3,4-tetrahydroisoquinoline hydrochloride is replaced by an equal molar amount of:

4-hydroxy-4-(p-tolyl)-1,2,3,4-tetrahydroisoquinoline,
4-hydroxy-4-(p-anisyl)-1,2,3,4-tetrahydroisoquinoline,
4-hydroxy-4-(o-ethylphenyl)-1,2,3,4-tetrahydroisoquinoline,
4-hydroxy-4-(p-ethylphenyl)-1,2,3,4-tetrahydroisoquinoline, and
4-hydroxy-4-(p-ethoxyphenyl)-1,2,3,4-tetrahydroisoquinoline, there are obtained, 4-(p-tolyl)-1,2,3,4-tetrahydroisoquinoline,
4-(p-anisyl)-1,2,3,4-tetrahydroisoquinoline,
4-(o-ethylphenyl)-1,2,3,4-tetrahydroisoquinoline,
4-(p-ethylphenyl)-1,2,3,4-tetrahydroisoquinoline, and
4-(p-ethoxyphenyl)-1,2,3,4-tetrahydroisoquinoline.

EXAMPLE 1

N-ethyl 4-phenyl-1,2,3,4-tetrahydroisoquinoline-2-carboxamide

To a stirred solution of 3.0 g. (0.014 mole) of 4-phenyl-1,2,3,4-tetrahydroisoquinoline in 50 ml. of dry benzene was added slowly a solution of 1.1 g. (0.014 mole) of ethyl isocyanate in 30 ml. of dry benzene. After the addition was complete the reaction mixture was stirred at room temperature for 30 minutes and then the solvent was evaporated at reduced pressure. The residual oil which crystallized on standing was recrystallized from benzene-isopropyl ether mixture yielding 2.0 g. (73%) of white product which melted at 148–150° C.

*Analysis.*—Calculated for $C_{18}H_{20}N_2O$ (percent): C, 77.11; H, 7.19; N, 9.99. Found (percent): C, 77.11; H, 7.18; N, 9.91.

Pharmacology: Two mice out of five were protected against electroshock-induced convulsions at a dose level of 100 mg./kg. intraperitoneally.

Using the procedure of Example 1, the following compounds are prepared from the stated ingredients:

N-ethyl 4 - (p-tolyl)-1,2,3,4-tetrahydroisoquinoline-2-carboxamide is prepared from 4-(p-tolyl)-1,2,3,4-tetrahydroisoquinoline and ethyl isocyanate;

N-phenyl 4 - (p-anisyl)-1,2,3,4-tetrahydroisoquinoline-2-carboxamide is prepared from 4-(p-anisyl)-1,2,3,4-tetrahydroisoquinoline and phenyl isocyanate, and N-phenyl 4 - (p-ethoxyphenyl) - 1,2,3,4 - tetrahydroisoquinoline - 2 - carboxamide is prepared from 4 - (p-ethoxyphenyl)-1,2,3,4-tetrahydroisoquinoline and phenyl isocyanate.

EXAMPLE 2

4-hydroxy-4-(m-trifluoromethylphenyl)-1,2,3,4-tetrahydroisoquinoline-2-carboxamide A mixture of 3.6 g. (0.012 mole) of 4-hydroxy-4-(m-trifluoromethylphenyl)-1,2,3,4-tetrahydroisoquinoline, 1.3 g. (0.013 mole) of nitrourea and 100 ml. of 95% ethanol was heated at ca. 60° C. until the evolution of gas ceased. The mixture was then refluxed for one hour, cooled, filtered and the solvent evaporated at reduced pressure. The residual oil which crystallized on trituration with ligroin was recrystallized from an isopropyl ether-ligroin mixture yielding 0.8 g. (21%) of white product melting at 129–132° C.

*Analysis.*—Calculated for $C_{17}H_{15}F_3N_2O_2$ (percent): C, 60.71; H, 4.50; N, 8.33. Found (percent): C, 60.99; H, 4.71; N, 8.12.

Pharmacology: Four mice out of five were protected against electroshock-induced convulsions at a dose level of 50 mg./kg. intraperitoneally.

EXAMPLE 3

4-hydroxy-4-phenyl-1,2,3,4-tetrahydroisoquinoline-2-carboxamide

A mixture of 3.4 g. (0.015 mole) of 4-hydroxy-4-phenyl-1,2,3,4-tetrahydroisoquinoline, 1.7 g. (0.016 mole) of nitrourea and 100 ml. of 95% ethanol was heated at ca. 60° C. until the evolution of gas ceased. The mixture was refluxed for one hour, cooled, filtered and the solvent evaporated at reduced pressure. The residual oil which crystallized on trituration with isopropyl ether was recrystallized from ethyl acetate, yielding 1.3 g. (33%) of white product melting at 166.5–168° C.

*Analysis.*—Calculated for $C_{16}H_{16}N_2O_2$ (percent): C, 71.62; H, 6.01; N, 10.44. Found (percent): C, 71.47; H, 6.04; N, 10.36.

Pharmacology: The $ED_{50}$ intraperitoneally was calculated by log probit analysis to be 66 mg./kg. against convulsions induced by electroshock.

EXAMPLE 4

N-methyl 4-phenyl-1,2,3,4-tetrahydroisoquinoline-2-thiocarboxamide

To a stirred solution of 3.6 g. of 4-phenyl-1,2,3,4-tetrahydroisoquinoline in 75 ml. of dry benzene at room temperature was added slowly a solution of 1.3 g. (0.018 mole) of methyl isothiocyanate in 25 ml. of dry benzene. The reaction mixture was stirred for one hour at ambient temperature, refluxed for 30 minutes and the solvent evaporated at reduced pressure. The residual oil which crystallized on cooling was recrystallized from a benzene-isooctane mixture yielding 3.4 g. (70%) of white product melting at 119–121° C.

*Analysis.*—Calculated for $C_{17}H_{18}N_2S$ (percent): C, 72.30; H, 6.42; N, 9.92. Found (percent): C, 72.32; H, 6.43; N, 9.79.

Pharmacology: The $ED_{50}$ intraperitoneally was calculated by log probit analysis to be 41 mg./kg. against convulsions induced by electroshock.

Using the procedure of Example 4, the following compounds are prepared from the stated ingredients:

N-ethyl 4-phenyl-1,2,3,4-tetrahydroisoquinoline-2-thiocarboxamide is prepared from 4-phenyl-1,2,3,4-tetrahydroisoquinoline and ethyl isothiocyanate;

N-ethyl 4-(p-tolyl) - 1,2,3,4 - tetrahydroisoquinoline-2-thiocarboxamide is prepared from 4-(p-tolyl)-1,2,3,4-tetrahydroisoquinoline and ethyl isothiocyanate;

N-phenyl 4-(p - tolyl)-1,2,3,4-tetrahydroisoquinoline-2-thiocarboxamide is prepared from 4-(p-tolyl)-1,2,3,4-tetrahydroisoquinoline and phenyl isothiocyanate, and N-phenyl 4-(p-anisyl)-1,2,3,4-tetrahydroisoquinoline-2-thiocarboxamide is prepared from 4-(p-anisyl)-1,2,3,4-tetrahydroisoquinoline and phenyl isothiocyanate.

EXAMPLE 5

N,N-diphenyl 4-phenyl-1,2,3,4-tetrahydro-isoquinoline-2-carboxamide

A mixture of 3.0 g. (0.014 mole) of 4-phenyl-1,2,3,4-tetrahydroisoquinoline, 3.3 g. (0.019 mole) of diphenylcarbamoyl chloride, 15 g. of sodium carbonate and 100 ml. of chloroform was stirred at room temperature for one hour and finally refluxed for one hour. The suspension was treated with 100 ml. of water, the organic layer was separated, washed with water and the solvent evaporated at reduced pressure to give N,N-diphenyl 4-phenyl-1,2,3,4-tetrahydroisoquinoline-2-carboxamide.

Using the procedure of Example 5, the following compounds are prepared from the stated ingredients:

N-phenyl-N-ethyl 4-phenyl-1,2,3,4-tetrahydroisoquinoline-2-carboxamide is prepared from 4-phenyl-1,2,3,4-tetrahydroisoquinoline and N-phenyl - N - ethylcarbamoyl chloride, and N,N-diethyl 4-phenyl-1,2,3,4-tetrahydroisoquinoline-2-carboxamide is prepared from 4-phenyl-1,2,3,4-tetrahydroisoquinoline and diethylcarbamoyl chloride.

Formulation and administration

Effective quantities of any of the foregoing pharmacologically active compounds may be administered to a living animal body orally as in capsules or tablets. Although very small quantities of the active material of the present invention, even as low as one milligram, are effective when minor therapy is involved or in cases of administration to subjects having relatively low body weight, unit dosages are usually 5 milligrams or above, and preferably 25, 50 or 100 milligrams or even higher. Five to 50 milligrams appears optimum, while usual broader ranges appear to be 1 to 100 milligrams per unit dose. The active agents of the invention may be combined with other pharmacologically active agents or with buffers, antacids or the like for administration, and the proportion of the active agent in the compositions may be varied widely. It is only necessary that the active ingredient constitute an effective amount, i.e., such that a suitable effective dosage will be obtained consistent with the dosage form employed. Obviously, several unit dosages may be administered at about the same time.

It is to be understood that the invention is not to be limited to the exact detail of operation or exact compounds shown and described, as obvious modification and equivalents will be apparent to one skilled in the art and the invention is therefore to be limited only by the scope of the appended claims.

What is claimed is:

1. A compound selected from the group consisting of compounds having the formula:

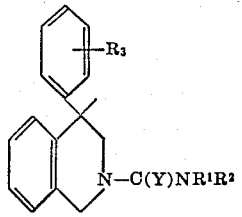

wherein;

$R^1$ is selected from the group consisting of hydrogen, lower-alkyl and phenyl, $R^2$ is selected from the group consisting of hydrogen, lower alkyl and phenyl, $R^3$ is selected from the group consisting of hydrogen, and trifluoromethyl, Z is selected from the group consisting of hydrogen and hydroxy, and Y is selected from the group consiting of oxygen and sulfur.

2. The compound of claim 1, which is N-ethyl 4-phenyl-1,2,3,4-tetrahydroisoquinoline-2-carboxamide.

3. The compound of claim 1, which is 4-hydroxy-4-(m-trifluoromethylphenyl) - 1,2,3,4 - tetrahydroisoquinoline-2-carboxamide.

4. The compound of claim 1, which is 4-hydroxy-4-phenyl-1,2,3,4-tetrahydroisoquinoline-2-carboxamide.

5. The compound of claim 1, which is N-methyl-4-phenyl - 1,2,3,4 - tetrahydroisoquinoline - 2-thiocarboxamide.

6. The compound of claim 1, which is N,N-diphenyl 4-phenyl - 1,2,3,4-tetrahydroisoquinoline-2-carboxamide.

References Cited

UNITED STATES PATENTS

| | | | |
|---|---|---|---|
| 3,247,211 | 4/1966 | Weaver et al. | 260—287 |
| 3,539,577 | 10/1970 | Davis | 260—287 |
| 3,666,763 | 5/1972 | Grethe | 260—289 R |

DONALD G. DAUS, Primary Examiner

U.S. Cl. X.R.

260—283 R, 287 R, 289 R, 453 AR, 453 AL, 451, 999